Dec. 9, 1969     A. A. BURRELL     3,482,890
BEARING
Filed April 27, 1966
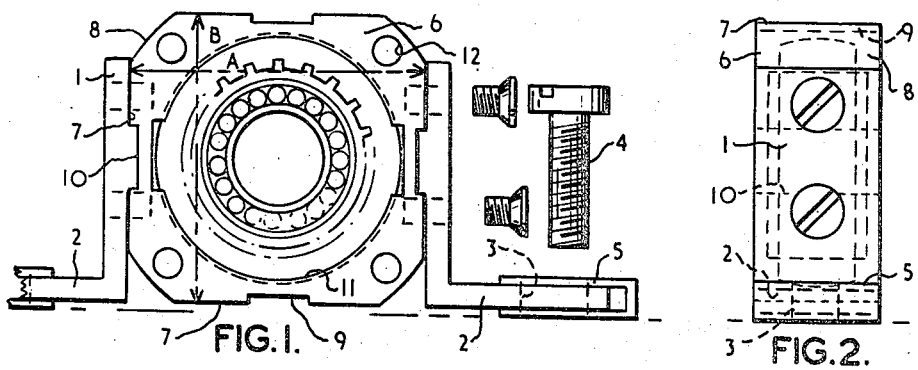
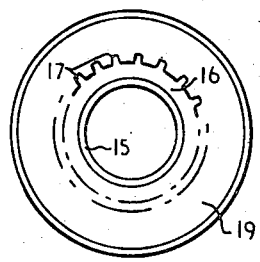
FIG.4.
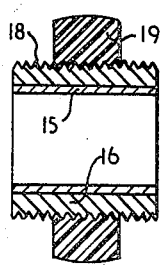
FIG.5.
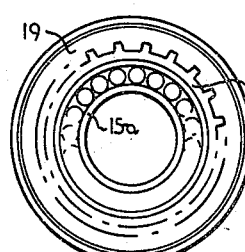
FIG.6.
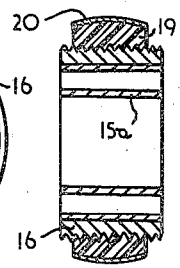
FIG.7.
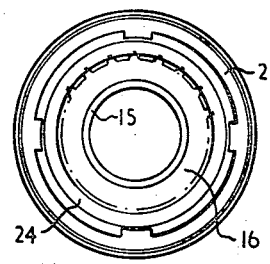
FIG.8.
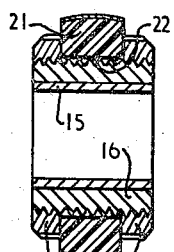
FIG.9.
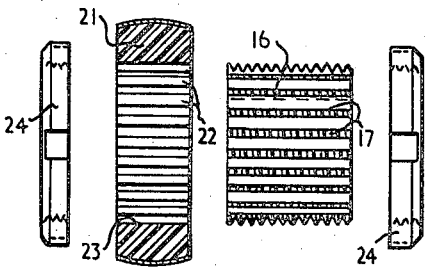
FIG.10.
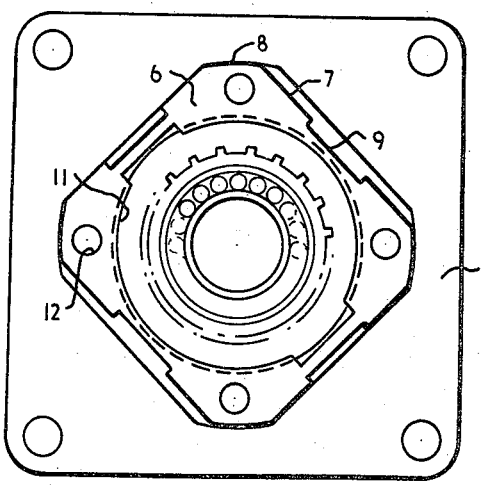
FIG.3.
INVENTOR
ALFRED A. BURRELL
ATTORNEY

# United States Patent Office 3,482,890
Patented Dec. 9, 1969

3,482,890
BEARING
Alfred A. Burrell, 10323 106th St., Edmonton,
Alberta, Canada
Filed Apr. 27, 1966, Ser. No. 545,709
Int. Cl. F16c 13/00, 39/00, 35/00
U.S. Cl. 308—15          3 Claims

ABSTRACT OF THE DISCLOSURE

A versatile bearing interchangeably useable with various kinds and sizes of pillow blocks and flange units having a bearing retainer removably carried in self-aligning relation in a cartridge that is selectably positionable in the pillow block or other support, provision being made for readily varying the base-to-center dimension of the bearing so that one size and design of cartridge can be used to replace bearings in a wide range of sizes and designs of pillow blocks and flange units.

---

This invention relates to improvements in a bearing and particularly to one possessed of wide versatility and that lends itself to modular fabrications.

Though the conventional split pillow blocks are being displaced by standarized high and low series sealed type pillow blocks, a wide range of bearing enclosures, both pillow blocks and flange units, for light, medium and heavy duty series bearings have been produced and are in general use with the result that the servicing of such equipment requires a dealer to stock a multitude of different sized replacements. As it is impractical to carry such extensive service stock outside large industrial centers, it is commercially desirable to employ a small assortment of standard sized universal or interchangeable bearing components for existing and new applications, such as will enable the servicing and replacement of an extensive variety of pillow block and flange units with only a few basic sizes.

Confronted with this need, my invention contemplates the provision of a proportioned housing, such as a pillow block having interchangeable feet or lugs with shims of different thickness, with a replaceable cartridge variously positionable therein that permits a new and unusually wide dimensionl flexibility in the selections of related components.

It is an object of this invention to provide such a replaceable cartridge for a pillow block or like housing that may be adjustably positioned therein as desired to vary the base-to-center dimension.

It is a further object to provide such a cartridge designed to receive a bearing, fixedly or separably carried in a self-aligning or floating retainer, in a manner similar to a sealed bearing in a solid or split pillow block.

It is a further object to provide a bearing enveloped in a splined and threaded sleeve that may be separably secured in the cartridge-carried retainer, allowing of the interchange of a wide range of bearing types and shaft sizes in a few standard sizes of retainers.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

FIGURE 1 is an elevation of a pillow block bearing embodying the present invention;

FIGURE 2 is a side elevation thereof;

FIGURE 3 is an elevation of a flange unit bearing;

FIGURES 4 and 5 are an elevation and vertical section respectively of one type of bearing molded in the retainer;

FIGURES 6 and 7 are an elevation and vertical section respectively of a modified form thereof;

FIGURES 8 and 9 are an elevation and vertical section of a bearing separably secured in the retainer; and FIGURE 10 is an exploded sectional elevation of such bearing assembly.

Because of the multitude of bearings in common use including high and low series pillow blocks solid and split, for light, medium and heavy duty; flange units; and an infinite variety of anti-friction types such as ball, roller, powdered metal, nylon sealed, self-aligning, etc., it is desirable to provide universal and interchangeable components that will reduce, as far as possible, the number of different items a dealer must stock to provide a comprehensive replacement service.

To this end my invention contemplates a pillow block 1 as seen in FIGURES 1 and 2, having individual and independent mounting lugs or feet 2 that may be spaced as required within the limits of the elongated slots 3 that accommodate the usual fastening bolts 4. The elevation of block is made variable by the provision of U-shaped shims 5 of selected thickness that are preferably magnetized to prevent accidental displacement and that are horizontally applied to the mounting lugs 2 to straddle the same; the arms of the shims being of different thickness and slotted similar to the mounting lugs.

A cartridge 6 for support in the pillow block is provided that is of generally rectangular form having four flat sides 7 separated by segments 8 described from a common center. To allow further range of selection in the base-to-center dimension in my bearing, the rectangular cartridge is preferably elongated, as shown in FIGURE 1, with the tranverse dimension A being greater than the other transverse dimension B. In heavy type bearings the cartridge may have a transverse groove 9 centrally of each of the sides to receive a companion projection 10 on the inside of the pillow block posts. The cartridge has a large circular opening 11 to accommodate a replaceable bearing in the manner common in pillow blocks and is also provided with four tapped holes 12 on each face for attachment of appropriate sealing devices or mounting plates. The holes 12 are equally spaced about the circumference of a circle described from the same center as the opening 11 and the perimeter segments 8.

FIGURE 3 shows an adaptation of a typical four-bolt flange block 14 incorporating my universal cartridge 6.

Receivable in this novel cartridge 6 are a variety of bearings such as those illustrated in FIGURES 4 to 10 inclusive. In FIGURES 4 and 5 a powdered metal bearing 15 is mounted in a steel sleeve 16 whose exterior wall has circumferentially spaced longitudinally extending splines 17 and a spiral thread 18. The sleeve 16 is secured in a molded retainer 19 of plastic or other suitable material and of external dimension appropriate to the cartridge receptacle. In FIGURES 6 and 7 the shaft carrying needle bearing 15a is similarly mounted in a splined and threaded steel sleeve 16 secured in a molded retainer 19 that for greater strength has its spherical outer diameter encased in a steel rim 20.

A further modified form of bearing is shown in FIGURES 8, 9 and 10, in which the bearing 15 in the threaded splined sleeve 16 is not permanently secured in the retainer 19 by molding but inserted axially into a modified retainer 21 that has spline-matching grooves 22 but no thread on its interior circumference 23 and secured by a pair of coacting nuts 24 threaded on said sleeve against opposite sides of said retainer.

Thus it will be seen how a desired bearing, encompassed in my splined and threaded sleeve can be fixedly or removably mounted in a floating or self-aligning retainer that is in turn insertable, much as a usual bearing element, in a universal cartridge selectably positionable in a pillow block, flange unit or the like. This assembly of interchangeable components enables the supplying of a bearing replacement from a greatly reduced number of stock parts in a few basic sizes and because it lends itself to modular fabrication permits the provision of a broad series of bearings at very reasonable cost.

From the foregoing description taken in connection with the accompanying drawings, it will be manifest that a bearing is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A bearing for pillow blocks, flange units and the like that permits dimensional flexibility between components comprising an elongated rectangular cartridge having one transverse dimension greater than the other with identical unit-matching groove formations located centrally on each side thereof for selective positioning in the unit to vary the base-to-center dimension and four tapped cartridge-mounting holes and a shaft-accommodating bearing enveloped in a coaxial retainer having a spherical outer diameter carried in said cartridge in self-aligning relation, said cartridge-mounting holes being equally spaced about the circumference of a circle described from the bearing center.

2. The bearing according to claim 1, wherein the elongated rectangular cartridge has a perimeter in which the four sides are separated by segments described from the bearing center.

3. The bearing according to claim 1, wherein the shaft-accommodating bearing is mounted in an exteriorly splined and threaded sleeve that is axially insertable in said retainer that is correspondingly interiorly splined, said threaded sleeve projecting beyond the sides of said retainer, and coacting nuts threaded on said sleeve against opposite sides of said retainer.

References Cited

UNITED STATES PATENTS

| | | | |
|---|---|---|---|
| 1,308,325 | 1/1919 | Bird. | |
| 1,460,520 | 7/1923 | Wark | 248—201 X |
| 1,905,277 | 4/1933 | Ewert. | |
| 1,915,058 | 6/1933 | French | 308—26 |
| 1,963,940 | 6/1934 | Duffy | 308—26 |
| 2,135,902 | 11/1938 | Leister | 308—26 X |
| 2,591,221 | 4/1952 | Whiteley | 308—72 |
| 3,066,000 | 11/1962 | James | 308—236 |
| 3,101,961 | 8/1963 | White. | |
| 3,160,449 | 12/1964 | Scott | 308—72 |
| 3,306,679 | 2/1967 | Stokeley | 308—26 |
| 3,314,736 | 4/1967 | Stokeley | 308—27 |
| 2,606,795 | 8/1952 | Hutton | 308—26 X |
| 2,695,200 | 11/1954 | Stanley | 308—194 X |
| 2,695,201 | 11/1954 | Leister | 308—194 X |
| 3,311,427 | 3/1967 | Toth | 308—72 X |
| 3,357,754 | 12/1967 | Betrix. | |

FOREIGN PATENTS

| | | |
|---|---|---|
| 519,443 | 6/1921 | France. |
| 913,077 | 8/1946 | France. |
| 1,031,084 | 3/1953 | France. |
| 375,968 | 4/1964 | Switzerland. |
| 139,208 | 5/1927 | Great Britain. |

MARTIN P. SCHWADRON, Primary Examiner

U.S. Cl. X.R.

308—27, 72, 236